United States Patent
Zhang et al.

(10) Patent No.: US 12,175,334 B2
(45) Date of Patent: Dec. 24, 2024

(54) METHOD FOR PROCESSING FREQUENCY CONTROL SIGNAL OF QUBIT AND SUPERCONDUCTING QUANTUM CHIP

(71) Applicant: TENCENT TECHNOLOGY (SHENZHEN) COMPANY LIMITED, Guangdong (CN)

(72) Inventors: Zhenxing Zhang, Guangdong (CN); Yu Zhou, Guangdong (CN); Yarui Zheng, Guangdong (CN); Shengyu Zhang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 481 days.

(21) Appl. No.: 17/585,471

(22) Filed: Jan. 26, 2022

(65) Prior Publication Data
US 2022/0147859 A1    May 12, 2022

Related U.S. Application Data (63) Continuation of application No. PCT/CN2021/111277, filed on Aug. 6, 2021.

(30) Foreign Application Priority Data

Oct. 9, 2020    (CN) .......................... 202011073820.5

(51) Int. Cl.
G06N 10/40    (2022.01)
(52) U.S. Cl.
CPC .................... G06N 10/40 (2022.01)
(58) Field of Classification Search
CPC .................................................. G06N 10/40
(Continued)

(56) References Cited

U.S. PATENT DOCUMENTS 10,416,288 B2 *  9/2019  Swanson ............ G02B 6/02042
10,817,797 B1 *  10/2020  Govia .................. H03K 19/195
(Continued)

FOREIGN PATENT DOCUMENTS

CN    105372642 A    3/2016
CN    109085728 A    12/2018
(Continued)

OTHER PUBLICATIONS

International Search Report and Written Opinion Issued in Application PCT/CN2021/111277 on Nov. 3, 2021 citing references AA, AM-AN, and AV therein (10 pages).
(Continued)

*Primary Examiner* — Jack Chiang
*Assistant Examiner* — Suchin Parihar
(74) *Attorney, Agent, or Firm* — ArentFox Schiff LLP (57) ABSTRACT

A method for processing a frequency control signal includes providing a square wave pulse to a target qubit, and controlling, after a first time elapses from an end time of the square wave pulse, the target qubit to rotate around a Y axis by a first target distance. The first time has a value that is variable. The method includes performing, after a second time elapses from the first time, a QST measurement on the target qubit and reconstructing a density matrix of the target qubit based on the QST measurement to obtain a phase parameter value of the target qubit associated with the value of the first time. Further, the method includes varying the first time and repeating the QST measurement in response to values of the first time to obtain phase parameter values associated with the values of the first time; and adjusting the frequency control signal accordingly.

20 Claims, 6 Drawing Sheets

(58) Field of Classification Search
USPC .......................................................... 716/100
See application file for complete search history.

(56) References Cited

U.S. PATENT DOCUMENTS

| | | | | |
|---|---|---|---|---|
| 11,550,872 | B1* | 1/2023 | Jiang | G06N 10/00 |
| 11,782,779 | B2* | 10/2023 | Albert | G06F 11/0751 |
| | | | | 706/45 |
| 11,861,457 | B2* | 1/2024 | Cao | G06N 10/60 |
| 11,977,956 | B2* | 5/2024 | Bloom | G06N 10/00 |
| 2009/0178483 | A1 | 7/2009 | Angelsen et al. | |
| 2016/0233965 | A1* | 8/2016 | Medford | H04B 10/90 |
| 2018/0225586 | A1 | 8/2018 | Chow et al. | |
| 2020/0234173 | A1* | 7/2020 | Medford | G06N 10/00 |
| 2020/0334101 | A1* | 10/2020 | Albert | G06F 11/0751 |
| 2021/0133614 | A1* | 5/2021 | Ashrafi | G06N 10/00 |
| 2021/0166133 | A1* | 6/2021 | Ronagh | G06F 9/45504 |
| 2021/0374595 | A1* | 12/2021 | Cao | G06N 10/60 |
| 2023/0196168 | A1* | 6/2023 | Li | G06F 1/022 |
| | | | | 716/100 |

FOREIGN PATENT DOCUMENTS

| | | | |
|---|---|---|---|
| CN | 109409526 | A | 3/2019 |
| CN | 110380791 | A | 10/2019 |
| CN | 110488091 | A | 11/2019 |
| CN | 110896336 | A | 3/2020 |
| CN | 111260066 | A | 6/2020 |
| CN | 112149832 | A | 12/2020 |

OTHER PUBLICATIONS

Ya Li Tian et al., "Quantum Tomography of a Single Qubit Encoded in the Single Neutral Atom", with English Abstract, Jun. 30, 2019 (7 pages).

Chinese Office Action with English Translation Issued in Application CN202011073820.5 on Dec. 16, 2021, citing references AB and AP-AT therein (7 pages).

Supplementary European Search Report issued Nov. 24, 2022 in Application No. 21851585.6, pp. 1-9.

Yan Zhiguang et al: "Strongly correlated quantum walks with a 12-qubit superconducting processor", Science, vol. 364, No. 6442, May 24, 2019, pp. 753-756, US, ISSN: 0036-8075, DOI: 10.1126/science.aaw1611, pp. 1-40.

Yoneda J et al: "Coherent spin qubit transport in silicon", arxiv.org, Cornell University Library, 201 Olin Library, Cornell University Ithaca, NY 14853, Aug. 10, 2020, DOI: 10.1038/S41467-021-24371-7, pp. 1-25.

* cited by examiner

METHOD FOR PROCESSING FREQUENCY CONTROL SIGNAL OF QUBIT AND SUPERCONDUCTING QUANTUM CHIP

RELATED APPLICATIONS

This application is a continuation of International Application No. PCT/CN2021/111277, filed on Aug. 6, 2021, which claims priority to the Chinese Patent Application No. 202011073820.5 filed on Oct. 9, 2020. The entire disclosures of the prior applications are hereby incorporated by reference in their entirety.

FIELD OF THE TECHNOLOGY

This disclosure relates to signal processing technologies, including a method and an apparatus for processing a frequency control signal of a quantum bit (qubit), a superconducting quantum chip, and a storage medium.

BACKGROUND OF THE DISCLOSURE

A qubit on a superconducting chip is a carrier of a quantum state and carries quantum information. Superconducting quantum computing has an advantage of a fast running speed and is widely used by people. Quantum computing is classified into single-bit logic gate computing and two-bit logic gate computing. A two-bit logic gate includes a quantum state swapping operation, a controlled NOT gate (CNOT) operation, a controlled phase gate (CZ) operation, and the like. The regulation and reading of a superconducting quantum chip are an important part in physical implementation of the quantum computing, and a high-precision quantum regulation and reading technology can improve the accuracy of a result of the quantum computing. Because a qubit chip is generally at an extremely low temperature (a temperature of approximately 10 mK), a signal generated by a room temperature control device needs to pass through a series of lines to reach the superconducting quantum chip. In this process, because the lines introduce additional capacitance and inductance, and a skin effect of the lines on a high-frequency signal causes that a magnetic field change actually sensed by the bit is different from an expected change, a shape of a waveform generates specific distortion, and the distortion has a very large impact on the precision and speed of a multi-bit gate. In addition, because such distortion mainly comes from devices, wires, chips, and packaging in low-temperature parts, the distortion changes with a temperature. Therefore, the distortion cannot be directly calibrated at room temperature. Therefore, the distortion needs to be measured at a low temperature by using the bit.

SUMMARY

In view of this, embodiments of this disclosure provide a method and an apparatus for processing a frequency control signal of a qubit, a superconducting quantum chip, and a storage medium.

In some examples, a method for processing a frequency control signal includes providing a square wave pulse to a target qubit, and controlling, after a first time elapses from an end time of the square wave pulse, the target qubit to rotate around a Y axis by a first target distance. The first time has a value that is variable. Then, the method includes performing, after a second time elapses from the first time, a quantum state tomography (QST) measurement on the target qubit and reconstructing a density matrix of the target qubit based on the QST measurement to obtain a phase parameter value of the target qubit associated with the value of the first time. Further, the method includes repeating the QST measurement in response to values of the first time to obtain phase parameter values of the target qubit associated with the values of the first time; and adjusting the frequency control signal based on the phase parameter values of the target qubit associated with the values of the first time.

In some examples, an apparatus for processing a frequency control signal includes a a signal transmission path for a target qubit and a processing circuitry for processing the frequency control signal. The processing circuitry provides, via the signal transmission path, a square wave pulse to the target qubit and control, after a first time elapses from an end time of the square wave pulse, the target qubit to rotate around a Y axis by a first target distance. The first time has a value that is variable. Then, the processing circuitry performs, after a second time elapses from the first time, a quantum state tomography (QST) measurement on the target qubit and reconstructs a density matrix of the target qubit based on the QST measurement to obtain a phase parameter value of the target qubit associated with the value of the first time. Further, the processing circuitry repeats the QST measurement in response to values of the first time to obtain phase parameter values of the target qubit associated with the values of the first time, and adjust the frequency control signal based on the phase parameter values of the target qubit associated with the values of the first time.

The embodiments of this disclosure further provide a superconducting quantum chip. The superconducting quantum chip includes a memory configured to store executable instructions; and a processor, configured to implement the foregoing method for processing a frequency control signal of a qubit when running the executable instructions stored in the memory.

The embodiments of this disclosure further provide a computer-readable storage medium such as a non-transitory computer-readably storage medium, storing executable instructions. The executable instructions, when executed by a processor, implementing the foregoing method for processing a frequency control signal of a qubit.

In this disclosure, a target qubit corresponding to a frequency control signal of a qubit is determined; a first square wave pulse is configured for the target qubit; when an end time of the first square wave pulse reaches a first time threshold, the target qubit is controlled to rotate around a Y axis by a first target distance; a quantum tomography measurement is performed on the target qubit when the end time of the first square wave pulse reaches a second time threshold; a density matrix of the target qubit is reconstructed based on a result of the QST measurement of the target qubit, to obtain a phase parameter of the target qubit; the first time threshold is adjusted, and an iterative measurement is performed on the target qubit, to determine a distortion amount of a frequency control signal of the target qubit by using different phase parameters in a result of the iterative measurement; and the frequency control signal is adjusted based on the distortion amount of the frequency control signal of the target qubit. Therefore, by using the method for processing a frequency control signal of a qubit provided in the present disclosure, distortion of a frequency control signal of a superconducting qubit may be measured in a room temperature state, properties of the transfer function are analyzed, and an environmental limitation that the distortion needs to be measured at a low temperature in a related technology is overcome; and a control line may be further corrected by using the properties of the transfer function obtained through measurement, to implement a fast frequency offset on the bit. In addition, when the coherence of the bit is poor, the distortion can still be effectively measured by using the method for processing a frequency control signal of a qubit provided in this disclosure, thereby reducing measurement errors.

BRIEF DESCRIPTION OF THE DRAWINGS

To describe the technical solutions of the embodiments of this disclosure or the related art more clearly, the following briefly introduces the accompanying drawings required for describing the embodiments or the related art. The accompanying drawings in the following description show merely some embodiments of this disclosure.

DESCRIPTION OF EMBODIMENTS

To make the objectives, technical solutions, and advantages of this disclosure clearer, the following further describes this disclosure in detail with reference to the accompanying drawings. The described embodiments are not to be considered as a limitation to this disclosure. All other embodiments obtained by a person of ordinary skill in the art based on the disclosure shall fall within the protection scope of this disclosure.

In the following descriptions, related "some embodiments" describe a subset of all possible embodiments. However, it may be understood that the "some embodiments" may be the same subset or different subsets of all the possible embodiments, and may be combined with each other without conflict.

Before the embodiments of this disclosure are further described in detail, a description is made on nouns and terms involved in the embodiments of this disclosure, and the nouns and terms involved in the embodiments of this disclosure are applicable to the following explanations.

1) "In response to" is used for representing a condition or status on which one or more operations to be performed depend. When the condition or status is met, the one or more operations may be performed in real time or after a set delay. Unless explicitly stated, there is no limitation on a chronological order in which the plurality of operations are performed.

2) "Based on" is used for representing a condition or status on which one or more operations to be performed depend. When the condition or status is met, the one or more operations may be performed in real time or after a set delay. Unless explicitly stated, there is no limitation on a chronological order in which the plurality of operations are performed.

3) "Superconducting qubit" is a superconducting quantum circuit formed by using a Josephson junction.

4) "Frequency control signal" is a direct current bias signal for controlling a qubit.

5) "QST measurement" may be used for measuring a complete quantum state.

6) "Transfer function" is a function used for describing an input-output relationship of a system.

Figure 1:
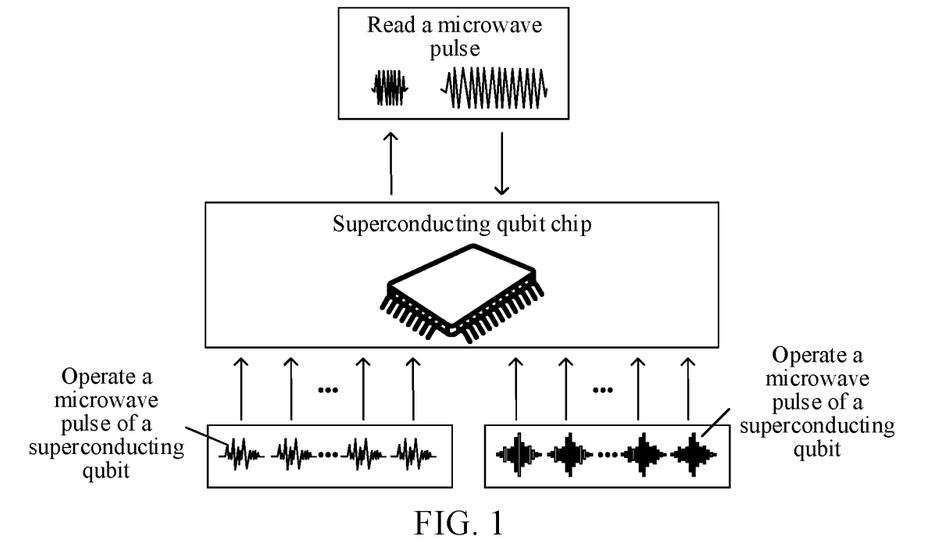
FIG. 1 is a schematic diagram of a use scenario of a method for processing a frequency control signal of a qubit according to an embodiment of this disclosure.

The following describes the method for processing a frequency control signal of a qubit provided in the embodiments of this disclosure. FIG. 1 is a schematic diagram of a use scenario of a method for processing a frequency control signal of a qubit according to an embodiment of this disclosure. Referring to FIG. 1, a superconducting quantum computer is a device that performs general-purpose computing by using quantum logic. Compared with a conventional computer, the superconducting quantum computer can greatly improve the operation efficiency when resolving some specific problems, and therefore attracts wide attention. A superconducting quantum chip may implement large-scale integration by using a related semiconductor process technology. In addition, the superconducting qubit shows superior performance than other physical systems in an aspect of key indicators required for quantum computing such as interaction control and selective operations and error correction, and is one of the most promising platforms for implementing the superconducting quantum computer. Specifically, the superconducting quantum computer mainly includes a superconducting quantum chip and a hardware system for chip control and measurement. The hardware system mainly includes signal generators in various microwave frequency bands and devices in various microwave frequency bands, including, but not limited to, a filter, an amplifier, an isolator, as well as a dilution refrigerator equipped with a microwave transmission line. A key technology of the superconducting quantum computer is to precisely control and accurately measure a qubit state on the superconducting quantum chip. Eigenenergy of the superconducting qubit is in a microwave band of gigahertz (GHz), to implement that a pulsed microwave signal with a specific phase, amplitude, and duration needs to be applied to the superconducting qubit during a quantum gate operation and reading of the quantum state. Therefore, the superconducting quantum computer requires a large quantity of signal sources in a microwave frequency band of GHz and an arbitrary waveform signal at a GHz sampling rate for modulation. In addition, the superconducting qubit needs to be kept at a temperature of millikelvin to reduce thermal noise to maintain a coherent state of the superconducting qubit for a long time, and the dilution refrigerator is generally selected to provide a low-temperature environment for the superconducting quantum chip. The dilution refrigerator needs to be equipped with the microwave transmission line, which transmits a microwave signal prepared at room temperature to the superconducting qubit in a low temperature state. As shown in FIG. 1, a control subsystem may be configured to control a state of the qubit for quantum computing, such as single-bit logic gate computing and two-bit logic gate computing. The superconducting quantum chip is configured to carry quantum computing information. A measurement subsystem is configured to read a final state of the qubit and obtain a computing result of the quantum computing. The superconducting quantum chip is disposed in a low-temperature environment. The control subsystem generates a pulse modulation signal according to a requirement of a quantum computing operation, inputs a series of microwave pulse sequences into the superconducting quantum chip, and operates a quantum state of the qubit. After all operations are completed, the measurement subsystem outputs a measurement pulse signal into the superconducting quantum chip, obtains state information of the qubit through a change of a returned signal, and finally obtains a computing result.

Figure 2:
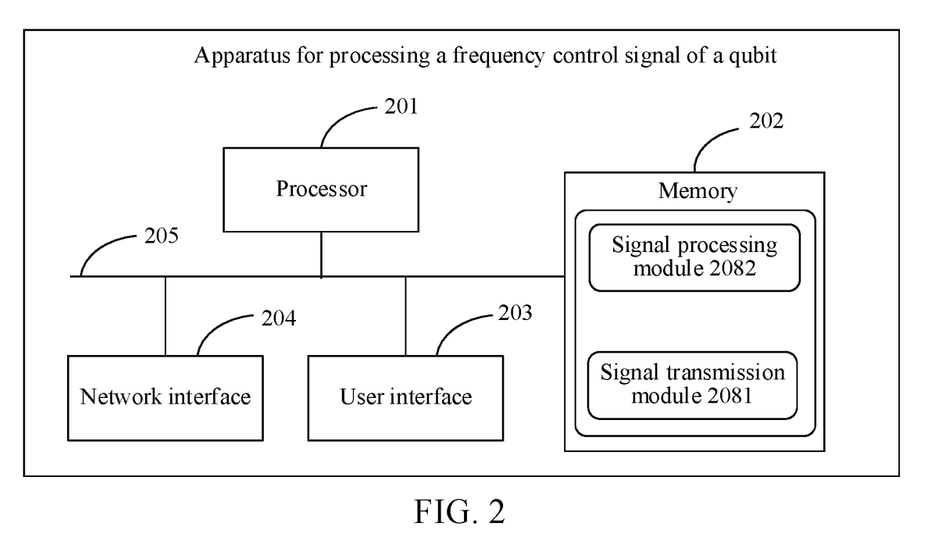
FIG. 2 is a schematic diagram of a composition structure of an apparatus for processing a frequency control signal of a qubit according to an embodiment of this disclosure.

The following describes a structure of an apparatus for processing a frequency control signal of a qubit in the embodiments of this disclosure in detail. The apparatus for processing a frequency control signal of a qubit may be implemented in various forms, such as by using a superconducting quantum chip with a processing function of the apparatus for processing a frequency control signal of a qubit, or an integrated chip with a processing function of the apparatus for processing a frequency control signal of a qubit, for example, a superconducting quantum chip 200 in FIG. 1. FIG. 2 is a schematic diagram of a composition structure of an apparatus for processing a frequency control signal of a qubit according to an embodiment of this disclosure. It may be understood that FIG. 2 only shows an exemplary structure rather than all structures of the apparatus for processing a frequency control signal of a qubit. A part of the structure or the entire structure shown in FIG. 2 may be implemented as required.

The apparatus for processing a frequency control signal of a qubit provided in the embodiments of this disclosure includes: at least one processor 201, a memory 202, a user interface 203, and at least one network interface 204. Various components in the apparatus for processing a frequency control signal of a qubit are coupled together by a bus system 205. It may be understood that the bus system 205 is configured to implement connection and communication between the components. In addition to a data bus, the bus system 205 further includes a power bus, a control bus, and a state signal bus. However, for ease of clear description, all types of buses are marked as the bus system 205 in FIG. 2.

The user interface 203 may include a display, a keyboard, a mouse, a track ball, a click wheel, a key, a button, a touch panel, a touchscreen, or the like.

It may be understood that, the memory 202 may be a volatile memory or a non-volatile memory, or may include both a volatile memory and a non-volatile memory. The memory 202 in this embodiment of this disclosure can store data to support operations in the superconducting quantum chip. Examples of the data include any computer program configured to be operated on a superconducting quantum chip of a terminal, for example, an operating system and an application program. The operating system includes various system programs, for example, a framework layer, a kernel library layer, and a drive layer, used for implementing various basic services and processing hardware-based tasks. The application program may include various application programs.

In some embodiments, the apparatus for processing a frequency control signal of a qubit provided in the embodiments of this disclosure may be implemented in a manner of a combination of software and hardware. For example, the apparatus for processing a frequency control signal of a qubit provided in the embodiments of this disclosure may be a processor in the form of a hardware decoding processor, and is programmed to perform the method for processing a frequency control signal of a qubit provided in the embodiments of this disclosure. For example, the processor in the form of a hardware decoding processor may use one or more application-specific integrated circuits (ASICs), digital signal processors (DSPs), programmable logic devices (PLDs), complex PLDs (CPLDs), field programmable gate arrays (FPGAs), or other electronic elements.

For example, the apparatus for processing a frequency control signal of a qubit provided in the embodiments of this disclosure is implemented by a combination of software and hardware. The apparatus for processing a frequency control signal of a qubit provided in the embodiments of this disclosure may be directly embodied as a combination of software modules executed by the processor 201. The software module may be located in a storage medium. The storage medium is located in the memory 202. The processor 201 reads executable instructions included in the software module in the memory 202, and implements, in combination with necessary hardware (for example, including the processor 201 and another component connected to the bus 205), the method for processing a frequency control signal of a qubit provided in the embodiments of this disclosure.

For example, the processor 201 may be processing circuitry such as a superconducting electronic chip having a signal processing capability, for example, a general-purpose processor, a DSP, or another PLD, discrete gate, transistor logical device, or discrete hardware component. The general-purpose processor may be a microprocessor, any conventional processor, or the like.

For example, the apparatus for processing a frequency control signal of a qubit provided in the embodiments of this disclosure is implemented by hardware, the apparatus provided in the embodiments of this disclosure may be directly executed by using the processor 201 in the form of a hardware decoding processor, for example, one or more ASICs, DSPs, PLDs, CPLDs, FPGAs, or other electronic elements, to perform the method for processing a frequency control signal of a qubit provided in the embodiments of this disclosure.

The memory 202 in this embodiment of this disclosure is configured to store various types of data to support operations of the apparatus for processing a frequency control signal of a qubit. Examples of the data include: any executable instruction configured to be operated on the apparatus for processing a frequency control signal of a qubit, for example, executable instructions, and a program that implements the method for processing a frequency control signal of a qubit in the embodiments of this disclosure may be included in the executable instructions.

In some other embodiments, the apparatus for processing a frequency control signal of a qubit provided in the embodiments of this disclosure may be implemented in a manner of software. FIG. 2 shows an apparatus for processing a frequency control signal of a qubit stored in the memory 202, which may be software in the form of a program, a plug-in, or the like, and includes a series of modules. An example of the program stored in the memory 202 may include the apparatus for processing a frequency control signal of a qubit. The apparatus for processing a frequency control signal of a qubit includes the following software modules, namely, a signal transmission module 2081 and a signal processing module 2082. When the software modules in the apparatus for processing a frequency control signal of a qubit are read by the processor 201 into a RAM for execution, the method for processing a frequency control signal of a qubit provided in the embodiments of this disclosure is implemented. Functions of the software modules in the apparatus for processing a frequency control signal of a qubit are as follows.

The signal transmission module 2081 is configured to determine a target qubit corresponding to a frequency control signal of a qubit.

The signal processing module 2082 is configured to configure a first square wave pulse for the target qubit,
  the signal processing module 2082 being configured to control, when an end time of the first square wave pulse reaches a first time threshold, the target qubit to rotate around a Y axis by a first target distance;
  the signal processing module 2082 being configured to perform a QST measurement on the target qubit when the end time of the first square wave pulse reaches a second time threshold;
  the signal processing module 2082 being configured to reconstruct a density matrix of the target qubit based on a result of the QST measurement of the target qubit, to obtain a phase parameter of the target qubit;
  the signal processing module 2082 being configured to: adjust the first time threshold, and perform an iterative measurement on the target qubit, to determine a distortion amount of a frequency control signal of the target qubit by using different phase parameters in a result of the iterative measurement; and
  the signal processing module 2082 being configured to adjust the frequency control signal based on the distortion amount of the frequency control signal of the target qubit.

In a multi-superconducting qubit system, an adjustment of a bit frequency may be generally used in generation of multi-bit quantum gate operations, and plays a significant role in formation of multi-bit entanglement for general-purpose quantum computing. Generally, a qubit frequency may be adjusted by using a magnetic flux passing through a loop. That is, the qubit frequency may be controlled by using a magnetic flux generated by an electric current. Because a qubit chip is generally at an extremely low temperature (a temperature of approximately 10 mK), a signal generated by a room temperature control device needs to pass through a series of lines to reach the superconducting quantum chip. In this process, because the lines introduce additional capacitance and inductance, and a skin effect of the lines on a high-frequency signal causes that a magnetic field change actually sensed by the bit is different from an expected change, a shape of a waveform generates specific distortion, and the distortion has a very large impact on the precision and speed of a multi-bit gate. In addition, because such distortion mainly comes from devices, wires, chips, and packaging in low-temperature parts, the distortion changes with a temperature. Therefore, the distortion cannot be directly calibrated at room temperature. Therefore, the distortion needs to be measured at a low temperature by using the bit.

In this process, it is assumed that a transfer function of a line obtained through measurement is H(f), and a time domain corresponding to the transfer function is h(t), where H(f) and h(t) have a relationship of Fourier transform, that is, $$H(f) = F[h(t)] = \int_{-\infty}^{\infty} h(t)e^{-2\pi i f t} dt.$$

Therefore, after passing through the line, any signal $Z_{in}(t)$ becomes $Z_{out}(t) = h(t) * Z_{in}(t)$, where * represents a convolution process. For details, refer to Formula 1:

$$Z_{out}(t) = h(t) * Z_{in}(t) = \int_{-\infty}^{\infty} h(t-x) Z_{in}(x) dx. \quad \text{Formula 1}$$

Further, standard deconvolution needs to be performed on the signal, so that the signal that reaches the superconducting qubit is a signal that meets an expectation. Assuming that the expected signal is $Z_0(t)$, a frequency domain is $Z_0(f)=F[Z_0(t)]$. If a transfer function form in a line part is H(f), and a corresponding time domain is h(t), a signal of Z(t) is outputted by a room temperature control device, and a frequency domain function Z(f) of Z(t) meets Formula 2: $Z_{in}(t)$ $$Z(f) = F[Z(t)] = \frac{Z_0(f)}{H(f)}, \quad \text{Formula 2}$$

where F[Z(t)] represents Fourier transform. For details, refer to Formula 3:

$$Z(f) = F[Z(t)] = \int_{-\infty}^{\infty} Z(t)e^{-2\pi i f t} dt. \quad \text{Formula 3}$$

After the signal Z(t) passes through the line and reaches the superconducting qubit, $Z_{out}(t)=h(t)*Z(t)=Z_0(t)$ is the expected $Z_0(t)$.

Figure 3:
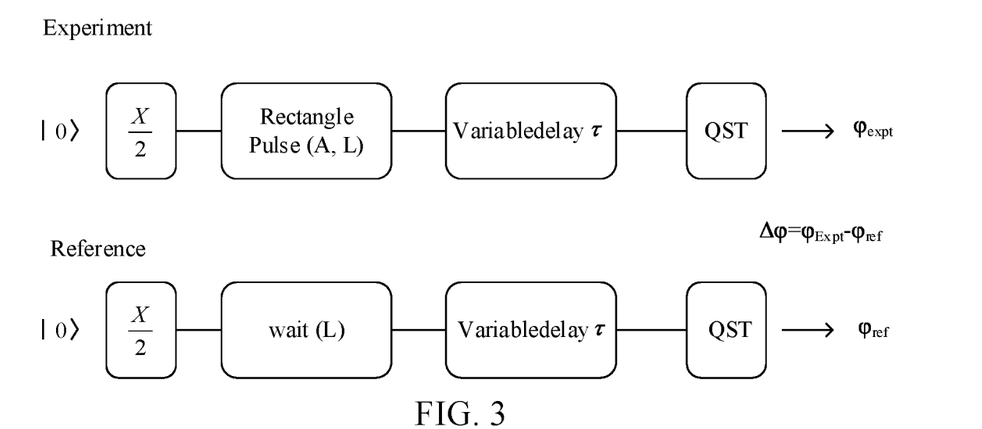
FIG. 3 is a schematic diagram of a process of processing a frequency control signal of a qubit according to an embodiment of this disclosure.

FIG. 3 is a schematic diagram of a process of processing a frequency control signal of a qubit according to an embodiment of this disclosure. A measurement on distortion is mainly performed by using a response of a qubit to a square wave. A response of the qubit after the square wave is applied may be mainly measured by using a QST measurement. Specifically, the measurement mainly includes an Experiment part and a Reference part. The Experiment part is mainly used for measuring the response, and the Reference part is used as a reference. Specifically, steps in the Experiment part include: 1) controlling a rotation angle $$\frac{\pi}{2} - \text{pulse}$$

around an X axis applied to a target qubit; 2) applying a square wave with a length of L and an amplitude of A to the target qubit; 3) performing a QST measurement after a waiting time τ; 4) reconstructing a density matrix ρ of the bit, and recording a phase φ exp t=arg $\rho_{01}$ of the bit in this case; and 5) changing the time τ, and repeating a process of the foregoing steps 1) to 4).

Steps in the Reference part include: 1) applying $$\frac{\pi}{2} - \text{pulse}$$

rotated around an X axis to a target qubit; 2) applying a square wave with a length of L and an amplitude of 0 to the target qubit, that is, a waiting time of L; 3) performing a QST measurement after a waiting time $\tau$; 4) reconstructing a density matrix $\rho$ of the bit, and recording a phase $\phi\text{ref}=\arg \rho_{01}$ of the bit in this case; and 5) changing the time $\tau$, and repeating a process of steps 1) to 4). Final data is $\Delta\phi = \phi_{exp\ \tau} - \phi_{ref}$, and is also referred to as measurement data. In this way, the response of the bit to the square wave is measured.

Figure 4:
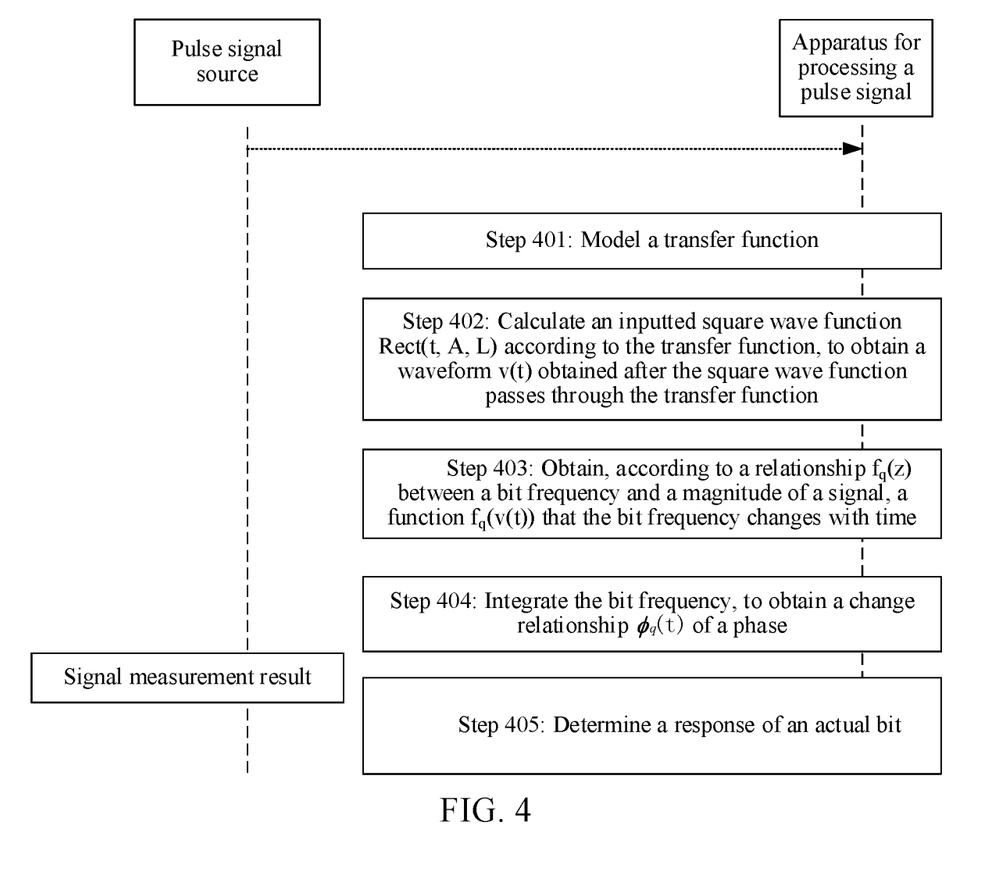
FIG. 4 is a schematic diagram of a process of processing a frequency control signal of a qubit according to an embodiment of this disclosure.

FIG. 4 is a schematic diagram of a process of processing a frequency control signal of a qubit according to an embodiment of this disclosure. A data processing part mainly includes the following steps:

At Step 401: A transfer function is modeled.

For a representation of the transfer function, refer to Formula 4:

$$H(f) = 1 + \sum_{k}^{N} \frac{2\pi f A_k i}{2i\pi f + \gamma k},$$ Formula 4 where $\{A_k, \gamma_k\}$ are modeling parameters, and represent an amplitude ($A_k$) and a corresponding attenuation constant ($\gamma_k$) respectively, and N represents a quantity of attenuation constants in the transfer function.

At Step 402: An inputted square wave function Rect(t, A, L) is calculated according to the transfer function, to obtain a waveform v(t) obtained after the square wave function passes through the transfer function.

At Step 403: According to a relationship $f_q(z)$ between a bit frequency and a magnitude of a signal, a function $f_q(v(t))$ that the bit frequency changes with time is obtained.

At Step 404: The bit frequency is integrated, to obtain a phase change relationship $\phi_q(t)$ of a phase.

At Step 405: A response of an actual bit is determined.

Specifically, based on the phase change relationship $\phi_q(t)$ obtained in Step 404 (with the modeling parameters $\{\gamma_k, A_k\}$), treating measurement data $\Delta\phi(\tau)$ as a dependent variable on $\tau$ which is used as an independent variable, a fitting to the measurement data $\Delta\phi(\tau)$ can be performed, to obtain optimal modeling parameters $\{\gamma_k, A_k\}$ as the response of the actual bit.

After an actual transfer function is obtained, the corresponding standard deconvolution process continues to be performed.

Figure 5:
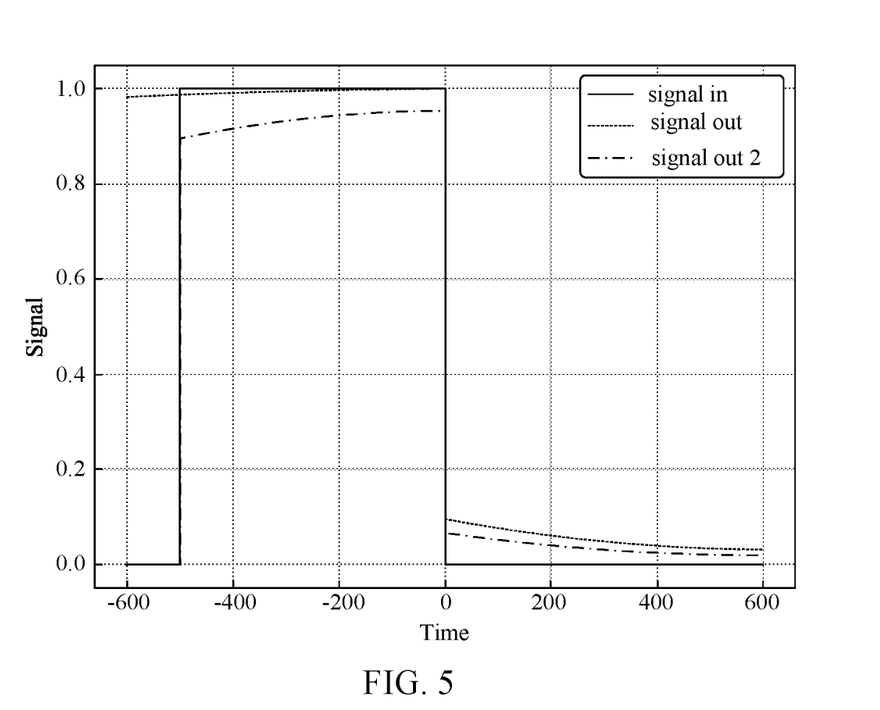
FIG. 5 is a schematic diagram of an effect of processing a frequency control signal of a qubit according to an embodiment of this disclosure.

FIG. 5 is a schematic diagram of an effect of processing a frequency control signal of a qubit according to an embodiment of this disclosure. A related measurement solution has the following problems:

First, because the square wave is applied to the qubit after $$\frac{\pi}{2} - \text{pulse},$$

the square wave also causes the qubit to perform phase accumulation. Therefore, whether the qubit is already in an unbiased state (that is, a frequency modulation signal is 0) at a specific time $\tau$ cannot be determined merely from a processing result. That is, when a value of $\tau$ cannot be determined from the processing result, the offset of the qubit frequency caused by distortion of the square wave has been almost eliminated. In addition, because fitting of an e exponential function is mainly included in the fitting function, a constant term has a greater impact on fitting parameters of the overall function, resulting in a significant deviation generated in an analysis of coefficients in the transfer function.

Second, before the square wave acts on the bit, the bit is in a $|0\rangle - i|1\rangle$ state. Therefore, the time L of the square wave and a subsequent waiting time $\tau$ cannot be too long, or otherwise the coherence of the qubit is exceeded and obtained phase information is invalid. In this case, the coherence of the bit needs to be adequate, and needs to exceed approximately three times a reciprocal of a minimum attenuation constant $\gamma_k$, that is, $T_2$: 3/min$\{\gamma k\}$, so that it can be ensured that the process of fitting is relatively reliable (that is, as shown in step 405).

Third, similar to the second point, because the related solution is affected by the coherence of the bit, an effective measurement cannot be performed when the attenuation constant $\gamma_k$ is relatively small (that is, a corresponding attenuation time $1/\gamma_k$ is relatively large). For a current general-purpose quantum chip package PCB, generally, each attenuation constant is relatively small, and $\gamma_k$ is approximately 1/(50 μs) to approximately 1/(10 us). That is, a corresponding attenuation time is approximately 10 μs to 50 μs. This requires $T_2$ to be close to approximately 30 μs to 150 μs. However, for a current superconducting qubit with an adjustable frequency, $T_2$ is generally about 10 μs. Therefore, it is almost impossible to perform the effective measurement on the current qubit in the related solution.

Fourth, in the related solution, due to the impact of the coherence of the bit, the length L of the square wave and the waiting time $\tau$ both need to be within the coherence $T_2$ of the bit. For the length L of the square wave, when L is less than an actual attenuation time $1/\gamma_k$, a problem of mutual influence between a rising edge and a falling edge of the square wave occurs. This causes a relatively large deviation between a result obtained through actual measurement and a result in an actual case, as shown by a schematic deviation in FIG. 5. When the time of the square wave is not less than three times the attenuation time $1\gamma_k$, in an actual outputted waveform (signal out in FIG. 5), there is a specific difference (signal out 2 in FIG. 5, where a length of the square wave is L=1500) between a response formed after the square wave ends and a response obtained after a long time. It indicates that when the length of the square wave is insufficient, the mutual influence between the falling edge and the rising edge of the square wave is caused.

FIG. 5 shows an input of a signal and an output of a signal. An attenuation constant is $\gamma_k=0.002=1/500$, and a corresponding amplitude is $A_k=-0.1$. Signal in is an input square wave, a start time of signal in is -500, an end time is 0, and a corresponding output of distortion is a line of signal out. Signal out 2 is an output signal corresponding to an input square wave with a start time of -1500 and an end time of 0.

Fifth, comparison needs to be performed in the related solution. For example, comparison of Experiment and Reference shown in FIG. 5 is performed. More accurate fitting can be performed only when comparison is performed. Otherwise, a slight deviation of the qubit frequency during processing causes that a phase that increases linearly with the time $\tau$ is then additionally superimposed in a final phase $\phi_{exp\ t}$, resulting in inaccurate final fitting.

Figure 6:
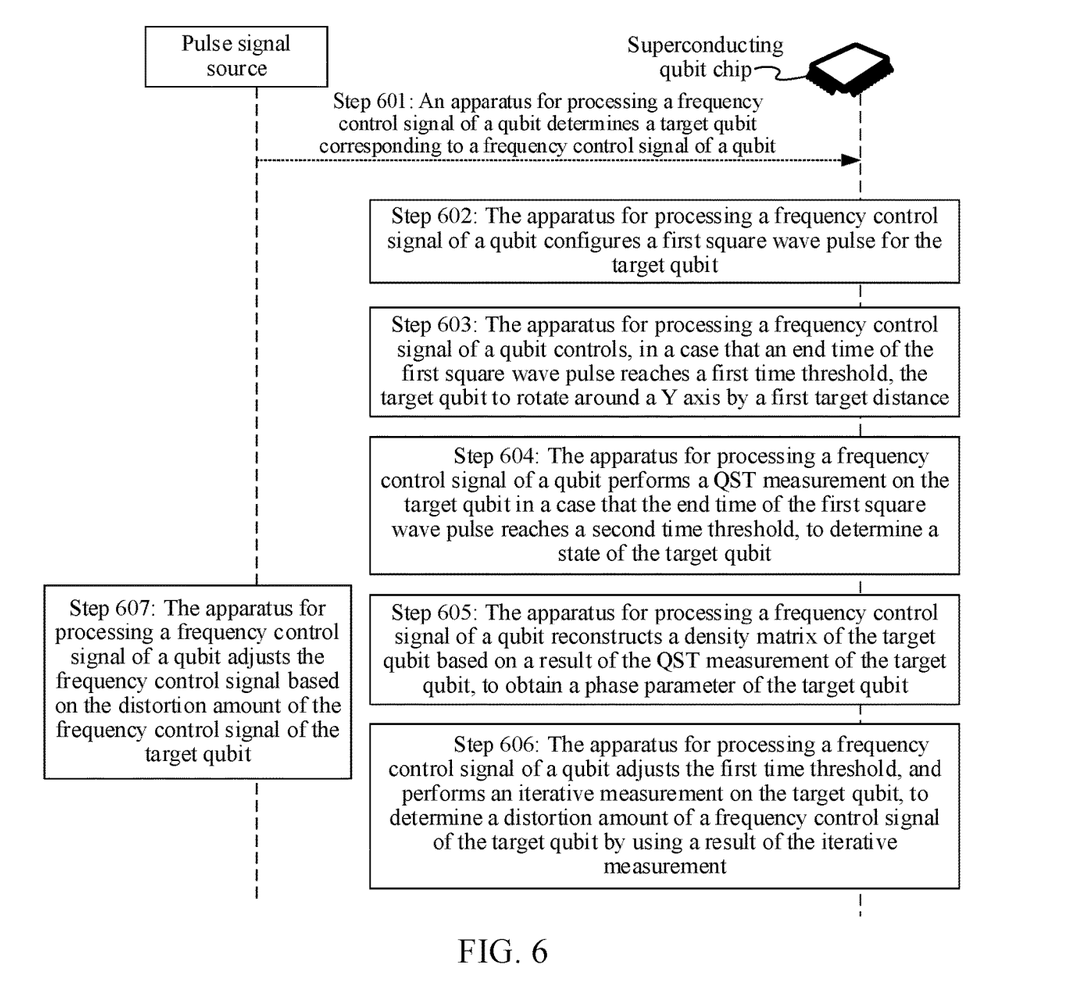
FIG. 6 is a schematic diagram of an exemplary process of a method for processing a frequency control signal of a qubit.

To overcome the foregoing defects, this disclosure provides a method for processing a frequency control signal of a qubit, implemented by a superconducting quantum chip. FIG. 6 is a schematic diagram of an exemplary process of a method for processing a frequency control signal of a qubit, which specifically includes the following steps:

At Step 601: An apparatus for processing a frequency control signal of a qubit determines a target qubit corresponding to a frequency control signal of a qubit.

The superconducting quantum chip is a core structure for implementing quantum computing. The superconducting quantum chip is formed by a large quantity of qubits. Each qubit is formed by a specific hardware circuit disposed on the quantum chip. Each qubit has at least two distinguishable logical states. Based on a quantum program, a controllable change may occur for the logical state of the qubit, to implement the quantum computing. The frequency control signal of the qubit is used for acting on the qubit of the quantum chip to change the logic state of the qubit.

At Step 602: The apparatus for processing a frequency control signal of a qubit configures a first square wave pulse for the target qubit.

In some embodiments of this disclosure, the configuring a first square wave pulse for the target qubit may be implemented in the following manner:

determining a pulse length and a pulse amplitude of the first square wave pulse corresponding to the target qubit; and determining a pulse end time of the first square wave pulse as a start time of performing the iterative measurement on the qubit. A square wave with a length of L and an amplitude of A is applied to the target qubit, and an end moment of the square wave is used as a time zero t=0.

The qubit is initially in a $|0\rangle$ state. After a first operation is applied, that is, the square wave with the length of L and the amplitude of A is applied (after step 601), the qubit is still in the $|0\rangle$ state. In this step, a falling edge (a rising edge) is formed by using a square wave. If the falling edge (the rising edge) may be approximated as a step function, formed distortion may be considered as a step response of a system, and transmission properties of the system may be directly derived from a result of the step response. On the other hand, because the qubit is always in the $|0\rangle$ state, and there is no decoherence process or energy relaxation process, the length L of the square wave may be much greater than the coherence of the qubit, to eliminate a restriction of the coherence of the qubit on the length of the square wave, thereby resolving the defects that the effective measurement cannot be performed on the current qubit in the related technology. Generally, considering the actual case, the distortion is close to 0 approximately 50 us after the square wave ends. Therefore, L is generally selected to be about 50 μs. If the distortion tends to 0 in a relatively short period of time in the actual case, a relatively short length of the square wave may be alternatively selected. For example, when the distortion tends to 0 approximately 1 μs after the square wave ends, the length of the square wave may be selected to be 1 μs. The selection of the length L of the square wave herein does not need to be very precise, provided that there is no obvious mutual influence between the rising edge and the falling edge of the square wave. For ease of subsequent description, in an embodiment, a moment at which the square wave ends is denoted by t=0.

At Step 603: The apparatus for processing a frequency control signal of a qubit controls, when an end time of the first square wave pulse reaches a first time threshold, the target qubit to rotate around a Y axis by a first target distance.

After the time $\tau$ is waited, that is, a Y/2 operation is applied to the qubit at a t=$\tau$ moment, the bit is in a $|0\rangle+|1\rangle$ state. The target qubit may rotate around a Y axis by an angle of $\pi/2$ by applying the Y/2 operation on the qubit, and further, when the rotation angle of the target qubit cannot be determined, the target qubit may further be controlled to rotate around the Y axis by corresponding displacement to achieve the same effect of rotating around the Y axis by the angle of $\pi/2$. Then, a time $t_0$ is waited. During this process, due to the distortion of the square wave, there is still a part of the frequency adjustment signals after the square wave ends. Therefore, the qubit performs phase accumulation within a period of time from t=$\tau$ to t=$\tau+t_0$. Then, a QST measurement is performed at the t=$\tau+t_0$ moment. $t_0$ generally cannot be too short, or otherwise phase accumulation within the period of time is excessively small, which is not conducive to measurement. However, in this case, $t_0$ is not excessively large, or otherwise the coherence $T_2$ of the qubit is exceeded, resulting in that a subsequent QST measurement is meaningless. It is found during processing that the accuracy of the measurement can be ensured provided that $t_0$ is generally selected to be above 200 ns. The coherence of the current qubit is generally on an order of μs. Therefore, $t_0$ selected from a range of 200 ns to 1 μs is a relatively appropriate value, which is completely feasible in processing.

At Step 604: The apparatus for processing a frequency control signal of a qubit performs a QST measurement on the target qubit when the end time of the first square wave pulse reaches a second time threshold.

Therefore, a state of a corresponding qubit may be determined according to a result of the QST measurement. For example, a state of a qubit (a quantum state) at a specific time point is the $|0\rangle$ state; or, the state (the quantum state) of the qubit at a specific time point is a $|1\rangle$ state, where $|\rangle$ represents a Dirac symbol.

At Step 605: The apparatus for processing a frequency control signal of a qubit reconstructs a density matrix of the target qubit based on a result of the QST measurement of the target qubit, to obtain a phase parameter of the target qubit.

In some embodiments of this disclosure, the performing a QST measurement on the target qubit when the end time of the first square wave pulse reaches a second time threshold may be implemented in the following manner:

determining a phase accumulation time area based on the first time threshold and the second time threshold; and performing the QST measurement on the target qubit based on the phase accumulation time area.

In some embodiments of this disclosure, the method further includes:

determining a first phase parameter corresponding to the qubit according to the start time of performing the iterative measurement on the qubit and the first time threshold; determining a second phase parameter of the qubit based on the first time threshold and the second time threshold; and determining a correspondence between a phase parameter of the target qubit and the first time threshold at a different measurement moment based on the first phase parameter and the second phase parameter. In the result of the QST measurement, a density matrix $\rho(\tau+t_0)$ of the qubit may be reconstructed, and phase information $\phi(\tau+t_0)=\arg \rho_{01}(\tau+t_0)$ of the qubit is recorded in this case, where $\rho_{01}(\tau+t_0)=\langle 0|\rho\tau+t_0|1\rangle$. The time $\tau$ is then changed later, and the foregoing processes (1) to 4)) are repeated, to obtain a correspondence between $\phi$ and $\tau$. Because the selection of the value of $\tau$ is not related to the coherence T2 of the qubit, and $\tau$ may be much greater than $T_2$, a very large value may be measured during actual processing, so that the phase of the bit that can be observed in this case is approximately stable. In this way, it can be ensured that more accurate parameter estimation is obtained during fitting, thereby resolving a greater impact generated by a constant term on fitting parameters of the overall function in the related technology, to avoid a defect of a significant deviation generated in an analysis of coefficients in the transfer function.

On the other hand, $t_0$ remains unchanged in the whole measurement solution. Therefore, even during processing, there is a slight error between calibration of the qubit frequency and a real result, and a phase offset caused by the error within this period of time $t \in [\tau, \tau + t_0]$ is fixed. That is, the phase offset $2\pi\delta f t_0$ caused by the inaccurate calibration of the bit frequency is not related to the changed time $\tau$. Therefore, the final fitting is not affected, and comparison is not needed, thereby resolving the defect that accurate fitting can be performed only after comparison is performed in the related technology, and saving use costs.

At Step 606: The apparatus for processing a frequency control signal of a qubit adjusts the first time threshold, and performs an iterative measurement on the target qubit, to determine a distortion amount of a frequency control signal of the target qubit by using different phase parameters in a result of the iterative measurement.

Figure 7:
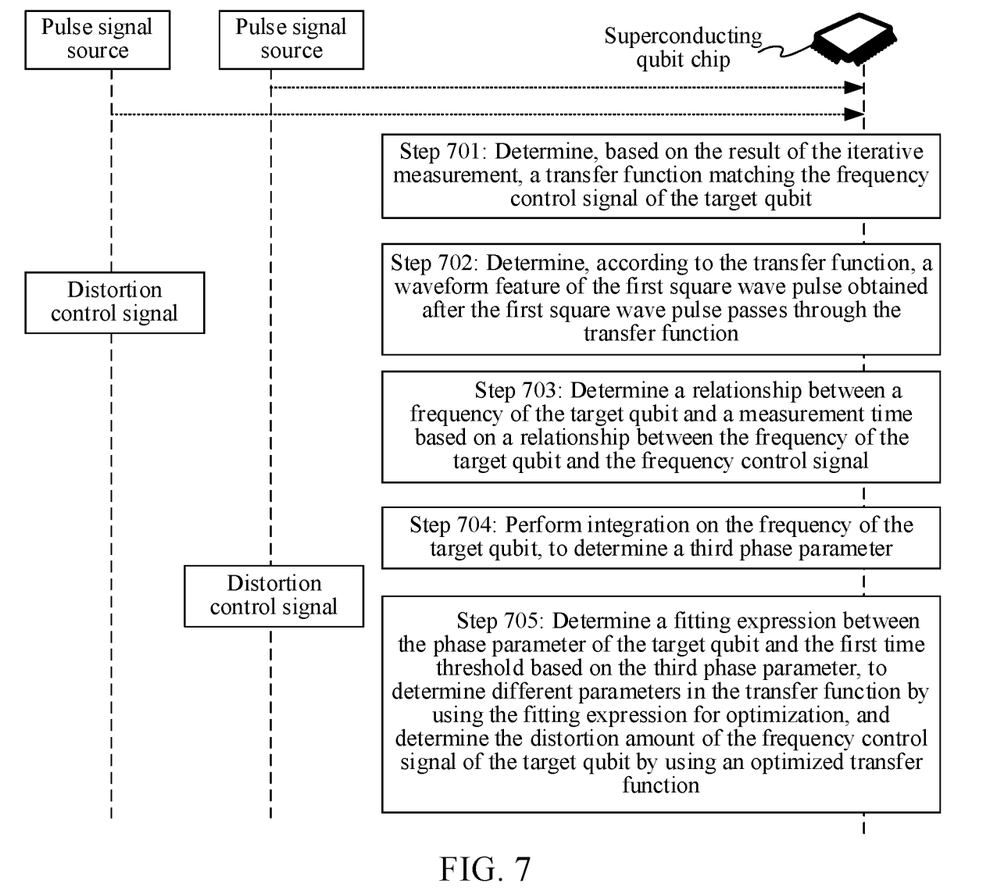
FIG. 7 is a schematic diagram of an exemplary process of a method for processing a frequency control signal of a qubit.

FIG. 7 is a schematic diagram of an exemplary process of a method for processing a frequency control signal of a qubit, which may be implemented by a superconducting quantum chip, and specifically includes the following steps:

At Step 701: Based on the result of the iterative measurement, a transfer function matching the frequency control signal of the target qubit is determined.

At Step 702: According to the transfer function, a waveform feature of the first square wave pulse obtained after the first square wave pulse passes through the transfer function is determined.

At Step 703: A relationship between a frequency of the target qubit and a measurement time is determined based on a relationship between the frequency of the target qubit and the frequency control signal.

At Step 704: Integration on the frequency of the target qubit is performed, to determine a third phase parameter.

At Step 705: A fitting expression between the phase parameter of the target qubit and the first time threshold based on the third phase parameter is determined, to determine different parameters in the transfer function by using the fitting expression for optimization, and determine the distortion amount of the frequency control signal of the target qubit by using an optimized transfer function.

After the distortion amount of the frequency control signal of the target qubit is determined, step 607 may further continue to be performed.

At Step 607: The apparatus for processing a frequency control signal of a qubit adjusts the frequency control signal based on the distortion amount of the frequency control signal of the target qubit.

In some embodiments of this disclosure, the adjusting the frequency control signal based on the distortion amount of the frequency control signal of the target qubit may be implemented in the following manner:

determining a corresponding expected frequency control signal and frequency domain parameter, a transfer function in a transmission line of the target qubit, and a time domain parameter corresponding to the transfer function based on the distortion amount of the frequency control signal of the target qubit; determining a real-time frequency control signal of the target qubit and a frequency domain function corresponding to the real-time frequency control signal; and performing deconvolution on the real-time frequency control signal, to implement that the frequency domain function corresponding to the real-time frequency control signal meets a deconvolution expression formed by the expected frequency control signal and frequency domain parameter, the transfer function in the transmission line of the target qubit, and the real-time frequency control signal.

Figure 8:
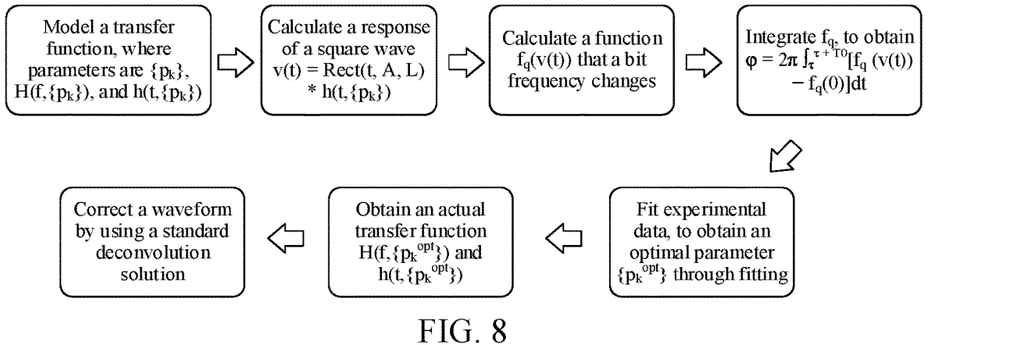
FIG. 8 is a schematic diagram of a process of processing a frequency control signal of a qubit according to an embodiment of this disclosure.

FIG. 8 is a schematic diagram of a process of processing a frequency control signal of a qubit according to an embodiment of this disclosure. The processing of data mainly includes the following steps:

modeling a transfer function, which is described by using a set of parameters $\{p_k\}$. That is, the transfer function is written as $H(f, \{p_k\})$, and a time domain of the the transfer function is $h(t, \{p_k\})$. Herein, a form of $H(f, \{p_k\})$ may be arbitrarily selected, and the form shown in Formula 5 may also be selected:

$$H(f) = 1 + \sum_k^N \frac{2\pi f A_k i}{2i\pi f + \gamma k}, \quad \text{Formula 5}$$

where $\{p_k\}$ is $\{A_k, \gamma_k\}$.

An inputted square wave $Rect(t, A, L)$ with an amplitude of A and a length of L is calculated according to the transfer function, to obtain a waveform of the square wave obtained after the square wave passes through the transfer function, which is denoted by $v(t)$, and $v(t)=h(t, \{p_k\})*Rect(t, A, L)$, where * represents a convolution operation. A zero time may be arbitrarily selected. In an embodiment, an end moment of the square wave is used as the zero time $t=0$.

According to a relationship $f_q(z)$ between the bit frequency and a magnitude of a direct current control signal, a relationship $f_q(v(t))$ that the bit frequency changes with time is obtained after the square wave is applied, and a case that $t \geq 0$ is mainly observed herein. In the case that $t<0$, when $t<0$, the square wave does not end yet, that is, a step signal is generated yet. Therefore, there is no need to consider the case.

The frequency $f_q(v(t))$ of the qubit is integrated to obtain a phase. The phase $\phi$ measured during processing is the phase accumulation of the offset of the bit frequency caused by the distortion of the square wave within the period of time $t \in [\tau, \tau + t_0]$. Therefore, the phase may be theoretically calculated by using Formula 6:

$$\phi(\tau, t_0) = 2\pi \int_\tau^{\tau + t_0} [f_q(v(t)) - f_q(0)] dt, \quad \text{Formula 6}$$

where $f_q(0)$ represents a frequency of the bit when the frequency modulation signal is 0. Because $f_q(v(t))$, $f_q(0)$, $\tau$, and $t_0$ are all known, Formula (6) may be completely determined.

Processing data $(\tau, \phi)$ is fitted by using Formula (6). During fitting, a processing data point $\tau$ is used as the independent variable $\tau$ in Formula (6), processing data $\phi$ is used as a value of the function, a processing parameter $t_0$ is transferred at the same time, and a modeling parameter $\{p_k\}$ of the transfer function is used as an optimization variable to optimize the values, to obtain an optimal modeling parameter $\{p_k^{opt}\}$. There may be a plurality of options in the manner of optimizing the values. Generally, a gradient-free optimization algorithm such as an Nelder-Mead algorithm, a Powell algorithm or a CMA-ES algorithm may be selected.

The optimal modeling parameter $\{p_k^{opt}\}$ obtained in the foregoing step is substituted into the foregoing model, to obtain a transfer function $H(f,\{p_k^{opt}\})$.

The waveform is corrected by using the standard deconvolution method described above (Formula (3)), so that a signal that finally reaches the bit is an expected signal.

In the foregoing manner, the distortion of the waveform of the control signal may be measured and corrected. Considering that the transfer function in the form of Formula (4) may better describe a behavior of an actual system, a detailed description is made herein. For the transfer function in the form of Formula (4), it is assumed that the length of the square wave is L, the amplitude is A, and the end time is t=0. That is, the square wave function Rect(t, A, L) meets Formula 7:

$$Rect(t, A, L) = A[Heav(t + L - Heav(t))] \quad \text{Formula 7}$$

where Heav(t) is a unit step function, which is defined as Formula 8:

$$Heav(t) \begin{cases} 0 & t < 0 \\ 1/2 & t = 0 \\ 1 & t > 0 \end{cases} \quad \text{Formula 8}$$

After the transfer function, for v(t), reference may be made to Formula 9:

$$v(t) = Rect(t, A, L) + \quad \text{Formula 9}$$
$$A\sum_{k}^{N} Ak[e^{-\gamma k(t+L)}Heav(t + L) - e^{-\gamma kt}Heav(t)].$$

The form of Formula (9) is substituted into the relationship $f_q(z)$ between the bit $f_q$ and the magnitude z of the control signal, to obtain a relationship $f_q(v(t))$ that the bit frequency changes with time. Formula (6) is then substituted for integrating the values, to obtain a relationship between $\phi$ and $\tau$, $t_0$.

Figure 9:
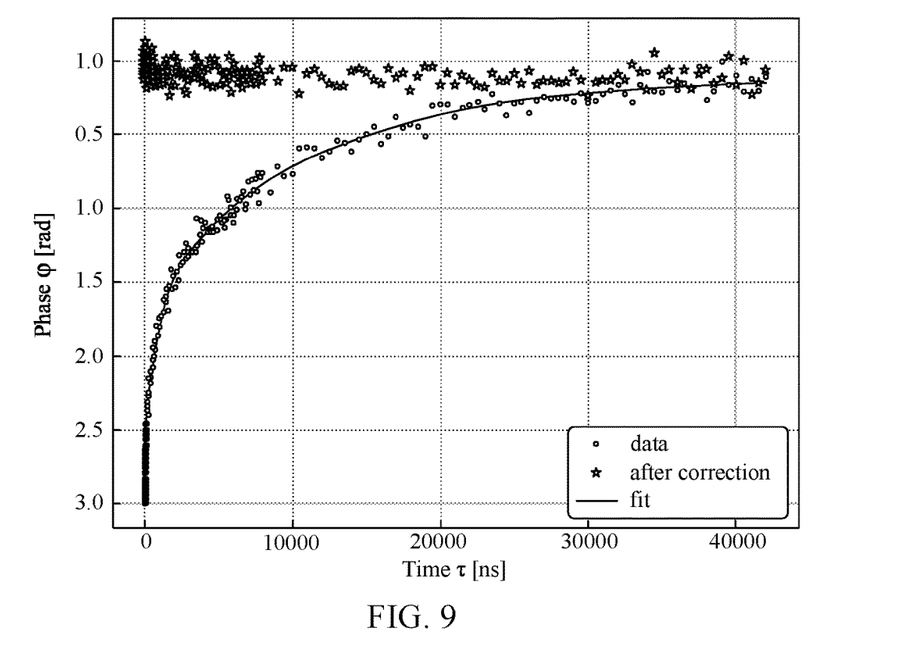
FIG. 9 is a schematic diagram of an effect of processing a frequency control signal of a qubit according to an embodiment of this disclosure.

Therefore, FIG. 9 is a schematic diagram of an effect of processing a frequency control signal of a qubit according to an embodiment of this disclosure. FIG. 9 shows measurement data of distortion of a frequency control signal of a frequency-adjustable Transmon superconducting qubit. Coherence data of the qubit is an energy relaxation time $T_1 \approx 15$ us, and a phase coherence time $T_2 \approx 8$ us. The measurement processing method may be based on the signal processing method provided in the foregoing embodiments. Selected parameters are as follows: The length of the square wave is 40 us, and the amplitude is A=0.5 (where 0.5 represents an amplitude of an arbitrary waveform generator, and has a linear relationship with an actual voltage). $t_0$ in Formula (6) is selected to be 500 ns, and $\tau$ changes from 10 ns to 40 µs. A result of processing the measurement is shown by hollow dots in FIG. 9. It can be learned from FIG. 9 that with the elapse of time $\tau$, the result of the processing is generally a result that the phase tends to 0. From the result, it may be estimated that a maximum time attenuation constant corresponding to the distortion of the actual control signal is approximately 10 µs to 20 µs. Therefore, it is relatively appropriate to select that the largest value of $\tau$ is 40 µs. In addition, when it is selected that the length of the square wave is L=40 µs, the mutual influence between the rising edge and the falling edge of the square wave can also be reduce to a relatively small extent.

A solid line part in FIG. 5 is the fitting performed according to the fitting method in the foregoing embodiments. For the selection of the model of the transfer function, refer to Formula 5, and a quantity N=3 is selected. From a fitting result, a fitting effect is better, and processed data points are basically on a fitting line. For parameters of the final fitting, refer to Table 1:

TABLE 1

| $\gamma_1$ [GHz] | $A_1$ | $\gamma_2$ [GHz] | $A_2$ | $\gamma_3$ [GHz] | $A_3$ |
|---|---|---|---|---|---|
| 0.00574 | −0.0151 | 0.001 | −0.00867 | $8.73e^{-5}$ | −0.024 |

From fitting data, time lengths corresponding to three attenuation constants are respectively $$\frac{1}{\gamma_1} \approx 174 \, ns,$$

$$\frac{1}{\gamma_2} \approx 1000 \, ns,$$

and $$\frac{1}{\gamma_3} \approx 11.454 us.$$

The largest time constant is 11.454 µs, which meets the foregoing estimation of the attenuation time.

Further, in some embodiments of this disclosure, a data calibration process may be further performed, and the transfer function is modeled by using parameters obtained through fitting in the data calibration process. An obtained processing result is data shown by a hollow five-pointed star in FIG. 8. It can be determined based on this that the phase of the qubit does not obviously change with time τ. Therefore, the method for processing a frequency control signal of a qubit provided in this disclosure has relatively high accuracy in measuring the transfer function. Therefore, a control line may be corrected by using properties of a transfer function obtained through measurement, to implement a fast frequency offset on the bit.

In this embodiment of this disclosure, a target qubit corresponding to a frequency control signal of a qubit is determined; a first square wave pulse is configured for the target qubit; when an end time of the first square wave pulse reaches a first time threshold, the target qubit is controlled to rotate around a Y axis by a first target distance; a quantum tomography measurement is performed on the target qubit when the end time of the first square wave pulse reaches a second time threshold; a density matrix of the target qubit is reconstructed based on a result of the QST measurement of the target qubit, to obtain a phase parameter of the target qubit; the first time threshold is adjusted, and an iterative measurement is performed on the target qubit, to determine a distortion amount of a frequency control signal of the target qubit by using different phase parameters in a result of the iterative measurement; and the frequency control signal is adjusted based on the distortion amount of the frequency control signal of the target qubit. Therefore, by using the method for processing a frequency control signal of a qubit provided in the present disclosure, distortion of a frequency control signal of a superconducting qubit may be measured in a room temperature state, properties of the transfer function are analyzed, and an environmental limitation that the distortion needs to be measured at a low temperature in a related technology is overcome; and a control line may be further corrected by using the properties of the transfer function obtained through measurement, to implement a fast frequency offset on the bit. In addition, when the coherence of the bit is poor, the distortion can still be effectively measured by using the method for processing a frequency control signal of a qubit provided in this disclosure, thereby reducing measurement errors.

The foregoing descriptions are merely embodiments of this disclosure, but are not intended to limit this disclosure. Any modification, equivalent replacement and improvement made within the spirit and principle of this disclosure shall fall within the protection scope of this disclosure.

What is claimed is:

1. A method for processing a frequency control signal, comprising:
   determining a target qubit corresponding to the frequency control signal;
   providing a square wave pulse to the target qubit;
   controlling, after a first time elapses from an end time of the square wave pulse, the target qubit to rotate around a Y axis by a first target distance, the first time having a value that is variable;
   performing, after a second time elapses from the first time, a quantum state tomography (QST) measurement on the target qubit;
   reconstructing a density matrix of the target qubit based on the QST measurement to obtain a phase parameter value of the target qubit associated with the value of the first time;
   varying the first time and repeating the QST measurement in response to values of the first time to obtain phase parameter values of the target qubit associated with the values of the first time; and
   adjusting the frequency control signal based on the phase parameter values of the target qubit associated with the values of the first time.

2. The method according to claim 1, wherein the providing the square wave pulse to the target qubit comprises:
   determining a pulse length and a pulse amplitude of the square wave pulse to be provided to the target qubit.

3. The method according to claim 1, wherein the second time is of a fixed value.

4. The method according to claim 3, wherein the performing the QST measurement on the target qubit comprises:
   determining a phase accumulation time range based on the value of the first time and the fixed value of the second time; and
   performing the QST measurement on the target qubit based on the phase accumulation time range.

5. The method according to claim 1, wherein the adjusting the frequency control signal comprises:
   determining, based on the phase parameter values of the target qubit associated with the values of the first time, a transfer function of a signal transmission path for providing the frequency control signal; and
   adjusting the frequency control signal based on the transfer function.

6. The method according to claim 5, wherein the determining the transfer function of the signal transmission path for providing the frequency control signal further comprises:
   determining, a transfer function model for the transfer function, the transfer function model comprising model parameters;
   determining, based on the transfer function model, a transmitted waveform by the signal transmission path in response to the square wave pulse, the transmitted waveform comprising the model parameters;
   determining a frequency function of the target qubit in response to the transmitted waveform, the frequency function comprising the model parameters;
   performing an integration on the frequency function of the target qubit, to determine a phase expression that comprises the model parameters; and
   determining the model parameters by a model fitting based on the phase parameter values of the target qubit associated with the values of the first time.

7. The method according to claim 5, wherein the adjusting the frequency control signal based on the transfer function comprises:
   determining an adjusted frequency control signal in a frequency domain based on a desired frequency control signal in the frequency domain and the transfer function; and
   transforming the adjusted frequency control signal from the frequency domain to a time domain.

8. An apparatus for processing a frequency control signal, comprising:
   a signal transmission path for a target qubit corresponding to the frequency control signal; and
   a processing circuitry configured to:
   determine the target qubit;
   provide, via the signal transmission path, a square wave pulse to the target qubit;
   control, after a first time elapses from an end time of the square wave pulse, the target qubit to rotate around a Y axis by a first target distance, the first time having a value that is variable;
   perform, after a second time elapses from the first time, a quantum state tomography (QST) measurement on the target qubit;
   reconstruct a density matrix of the target qubit based on the QST measurement to obtain a phase parameter value of the target qubit associated with the value of the first time;
   vary the first time and repeat the QST measurement in response to values of the first time to obtain phase parameter values of the target qubit associated with the values of the first time; and
   adjust the frequency control signal based on the phase parameter values of the target qubit associated with the values of the first time.

9. The apparatus according to claim 8, wherein the processing circuitry is configured to:
   determine a pulse length and a pulse amplitude of the square wave pulse to be provided to the target qubit.

10. The apparatus according to claim 8, wherein the second time is of a fixed value.

11. The apparatus according to claim 10, wherein the processing circuitry is configured to:
    determine a phase accumulation time range based on the value of the first time and the fixed value of the second time; and
    perform the QST measurement on the target qubit based on the phase accumulation time range.

12. The apparatus according to claim 8, wherein the processing circuitry is configured to:
    determine, based on the phase parameter values of the target qubit associated with the values of the first time, a transfer function of the signal transmission path; and adjust the frequency control signal based on the transfer function.

13. The apparatus according to claim 12, wherein the processing circuitry is configured to:
  determine, a transfer function model for the transfer function, the transfer function model comprising model parameters;
  determine, based on the transfer function model, a transmitted waveform by the signal transmission path in response to the square wave pulse, the transmitted waveform comprising the model parameters;
  determine a frequency function of the target qubit in response to the transmitted waveform, the frequency function comprising the model parameters;
  perform an integration on the frequency function of the target qubit, to determine a phase expression that comprises the model parameters; and
  determine the model parameters by a model fitting based on the phase parameter values of the target qubit associated with the values of the first time.

14. The apparatus according to claim 12, wherein the processing circuitry is configured to:
  determine an adjusted frequency control signal in a frequency domain based on a desired frequency control signal in the frequency domain and the transfer function; and
  transform the adjusted frequency control signal from the frequency domain to a time domain.

15. A non-transitory computer-readable storage medium storing instructions which when executed by at least one processor cause the at least one processor to perform:
  determining a target qubit corresponding to the frequency control signal;
  providing a square wave pulse to the target qubit;
  controlling, after a first time elapses from an end time of the square wave pulse, the target qubit to rotate around a Y axis by a first target distance, the first time having a value that is variable;
  performing, after a second time elapses from the first time, a quantum state tomography (QST) measurement on the target qubit;
  reconstructing a density matrix of the target qubit based on the QST measurement to obtain a phase parameter value of the target qubit associated with the value of the first time;
  varying the first time and repeating the QST measurement in response to values of the first time to obtain phase parameter values of the target qubit associated with the values of the first time; and
  adjusting a frequency control signal to the target qubit based on the phase parameter values of the target qubit associated with the values of the first time.

16. The non-transitory computer-readable storage medium according to claim 15, wherein the instructions cause the at least one processor to perform:
  determining a pulse length and a pulse amplitude of the square wave pulse to be provided to the target qubit.

17. The non-transitory computer-readable storage medium according to claim 15, wherein the second time is of a fixed value.

18. The non-transitory computer-readable storage medium according to claim 17, wherein the instructions cause the at least one processor to perform:
  determining a phase accumulation time range based on the value of the first time and the fixed value of the second time; and
  performing the QST measurement on the target qubit based on the phase accumulation time range.

19. The non-transitory computer-readable storage medium according to claim 15, wherein the instructions cause the at least one processor to perform:
  determining, based on the phase parameter values of the target qubit associated with the values of the first time, a transfer function of a signal transmission path for providing the frequency control signal; and
  adjusting the frequency control signal based on the transfer function.

20. The non-transitory computer-readable storage medium according to claim 19, wherein the instructions cause the at least one processor to perform:
  determining, a transfer function model for the transfer function, the transfer function model comprising model parameters;
  determining, based on the transfer function model, a transmitted waveform by the signal transmission path in response to the of the square wave pulse, the transmitted waveform comprising the model parameters;
  determining a frequency function of the target qubit in response to the transmitted waveform, the frequency function comprising the model parameters;
  performing an integration on the frequency function of the target qubit, to determine a phase expression that comprises the model parameters; and
  determining the model parameters by a model fitting based on the phase parameter values of the target qubit associated with the values of the first time.

* * * * *

UNITED STATES PATENT AND TRADEMARK OFFICE
CERTIFICATE OF CORRECTION

PATENT NO.         : 12,175,334 B2  
APPLICATION NO.    : 17/585471  
DATED              : December 24, 2024  
INVENTOR(S)        : Zhenxing Zhang et al.

Page 1 of 1

It is certified that error appears in the above-identified patent and that said Letters Patent is hereby corrected as shown below:

On the Title Page

Item (71), the Applicant city reads as:  
Guangdong (CN)  
Should read as:  
--Shenzhen (CN)--

Item (72), all 4 inventors city reads as:  
Guangdong (CN)  
Should read as:  
--Shenzhen (CN)--

Signed and Sealed this  
Eighth Day of April, 2025

Coke Morgan Stewart  
*Acting Director of the United States Patent and Trademark Office*